(12) United States Patent
Tobolka

(10) Patent No.: US 6,178,724 B1
(45) Date of Patent: *Jan. 30, 2001

(54) CONTAINER FORMING APPARATUS AND METHOD

(75) Inventor: Stefan Tobolka, Ontario (CA)

(73) Assignee: Arkmount Systems Inc., Toronto (CA)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/959,675

(22) Filed: Oct. 29, 1997

(51) Int. Cl.$^7$ ................... B65B 9/06; B65B 9/12
(52) U.S. Cl. ................... 53/451; 53/477; 53/511; 53/546; 53/551
(58) Field of Search ............... 53/511, 512, 526, 53/433, 551, 289, 451, 374.2, 546, 477, 412, 133.2, 133.1

(56) References Cited

U.S. PATENT DOCUMENTS

| | | | |
|---|---|---|---|
| 2,339,896 | * 1/1944 | Waters | 53/289 |
| 2,866,488 | 12/1958 | Thompson | 383/37 |
| 2,999,627 | 9/1961 | Reinhardt | 383/9 |
| 3,009,498 | 11/1961 | Fohr | 383/44 |
| 3,325,961 | 6/1967 | Lindh | 53/451 |
| 3,378,988 | * 4/1968 | McClosky | 53/551 |
| 3,381,441 | * 5/1968 | Condo | 53/551 |
| 3,387,701 | 6/1968 | Schneider | 206/527 |
| 3,482,373 | * 12/1969 | Morris | 53/551 |
| 3,488,915 | * 1/1970 | Delestatius | 53/511 |
| 3,849,965 | * 11/1974 | Dominici | 53/451 |
| 4,041,851 | 8/1977 | Jentsch | 493/200 |
| 4,361,235 | 11/1982 | Gautier | 206/527 |
| 4,384,440 | 5/1983 | Ohlsson | 53/451 |
| 4,464,156 | 8/1984 | Holmstrom | 53/451 |
| 4,566,249 | * 1/1986 | Schwerdtel | 53/511 |
| 4,649,696 | 3/1987 | Brie | 53/370.4 |
| 4,747,253 | 5/1988 | Schulte | 53/451 |
| 4,848,063 | 7/1989 | Niske | 53/451 |
| 5,031,386 | * 7/1991 | Schneider | 53/551 |
| 5,170,609 | * 12/1992 | Bullock | 53/511 |
| 5,220,771 | * 6/1993 | Burns | 53/551 |
| 5,378,065 | 1/1995 | Tobolka | 383/9 |
| 5,408,807 | * 4/1995 | Lane | 53/551 |
| 5,454,208 | 10/1995 | Kawano | 53/451 |
| 5,715,656 | * 2/1998 | Pearce | 53/451 |
| 5,755,076 | * 5/1998 | Otsuka | 53/551 |
| 5,761,884 | * 6/1998 | Tobolka | 53/451 |

FOREIGN PATENT DOCUMENTS 915519   1/1963   (GB).
2271753  10/1993  (GB).

* cited by examiner

Primary Examiner—Peter Vo
Assistant Examiner—James Calve
(74) Attorney, Agent, or Firm—Baker & Daniels

(57) ABSTRACT

A container forming apparatus to form fluid filled containers from a tube of flexible packaging material includes a fluid delivery conduit to deliver fluid into the tube. A heat sealing mechanism receives the tube and forms spaced seals across the tube between which fluid is located. The seals are formed in a downstream to upstream succession and are non-orthogonal with respect to a longitudinal axis of the tube. Hydraulic equalization supports associated with the heat sealing mechanism support the tube indirections generally orthogonal to the longitudinal axis adjacent the seals as the seal is formed.

19 Claims, 16 Drawing Sheets

CONTAINER FORMING APPARATUS AND METHOD

FIELD OF THE INVENTION

The present invention relates to packaging and in particular to a container forming apparatus and method.

BACKGROUND OF THE INVENTION

Form, fill and seal packaging machines to form fluid filled containers from a tube of flexible packaging material are known in the art. For example, U.S. Pat. No. 4,747,253 to Schulte discloses an apparatus for the proportion of the contents during the manufacture of packing containers. The apparatus includes a filling tube extending into a tube of laminated packaging material to deliver milk into the tube of packaging material. A sealing mechanism below the filling tube forms transverse seals across the tube of packaging material to divide the tube of packaging material into individual cushion-shaped packing containers. Cuts are then formed along the seals to separate the individual packing containers. A gas feed pipe is connected to the filling tube to introduce gas into the tube of packaging material to express air before the individual packing containers are formed so that introduced gas is trapped in each packing container as it is formed. The amount of gas introduced into the tube of packaging material is the same as the volume of the air space provided in the individual packing containers. Unfortunately, gas and/or air in the packing container tends to decrease product life.

An alternative apparatus to form fluid filled containers is disclosed in International Application No. PCT/CA96/00783 published on Jun. 5, 1997 under publication No. WO 97/19852 for an invention entitled "Container With Dispensing Spout and Method for Making Same" and assigned to the assignee of the present invention. Each fluid filled container formed by the apparatus includes a body defining an internal reservoir and a narrow, integral dispensing spout extending from the body. The apparatus includes a filling tube extending into a tube of packaging material to delivery fluid into the tuber of packaging material. A heat sealing mechanism having upstream and downstream heat sealing bars forms spaced, curvilinear heat seals across the tube of packaging material defining opposed sides of a container. A fluid displacement mechanism in the form of a cylindrical bar is associated with each heat sealing bar.

In operation, a heat seal is initially formed at the bottom of the tube of packaging material allowing fluid to be delivered into the tube of packaging material via the filling tube. The fluid level in the tube of packaging material is set above the heat sealing bars to that when the curvilinear seals are formed across the tube of packaging material, the resulting containers are filled with fluid and void of air or other gasses. Once fluid has been delivered to the tube of packaging material, the fluid displacement mechanism associated with the downstream heat sealing bar is brought into contact with the tube of packaging material to displace fluid upwardly. The downstream heat sealing bar is then brought into contact with the tube of packaging material to form a heat seal thereacross through the fluid in the tube of packaging material. The heat seal is then cut to separate the container from the tube of packaging material.

Thereafter, the fluid displacement mechanism associated with the upstream heat sealing bar is brought into contact with the tube of packaging material to displace fluid upwardly. The upstream heat sealing bar is then brought into contact with the tube of packaging material to form a heat seal thereacross and the heat seal is cut to separate the container from the tube of packaging material. Once this has been done, the tube of packaging material is indexed and the process is performed again to form successive, alternatively oriented, interlocked, fluid filled containers. The fluid displacement mechanisms displace sufficient fluid prior to forming the heat seals so that the containers can be made self-supporting and so that the volume of fluid in each container is generally less than or equal to the volume of the reservoir. In this manner, the spouts can be devoid of fluid allowing the spouts to be folded over and releasably attached to the bodies.

Although this container forming apparatus overcomes problems associated with conventional container forming apparatuses by forming fluid filled containers devoid of air or other gasses, which extends product life, improvements to container forming apparatuses are continually being sought.

It is therefore an object of the present invention to provide a novel container forming apparatus and method.

SUMMARY OF THE INVENTION

According to one aspect of the present invention there is provided a method of forming fluid filled containers from a tube of flexible packaging material comprising the steps of:
  delivering fluid to said tube;
  forming seals across said tube at spaced locations between which fluid is located, said seals being formed in a downstream to upstream succession and being non-orthogonal with respect to a longitudinal axis of said tube; and
  supporting said tube in a direction generally orthogonal to said longitudinal axis adjacent said seals as each seal is being formed.

According to another aspect of the present invention there is provided a container forming apparatus to form fluid filled containers from a tube of flexible packaging material comprising:
  a fluid delivery conduit to delivery fluid into said tube;
  a heat sealing mechanism receiving said tube and forming spaced seals across said tube between which fluid is located, said seals being formed in a downstream to upstream succession and being non-orthogonal with respect to a longitudinal axis of said tube; and
  hydraulic equalization supports associated with said heat sealing mechanism to support said tube in directions generally orthogonal to said longitudinal axis adjacent said seals as each seal is being formed.

The present invention provides advantages in that since the tube is supported in a direction generally orthogonal to the longitudinal axis of the tube as the curvilinear seals are being formed, the hydraulic forces applied to the tube are equalized allowing high integrity seals to be formed and inhibiting the shape of the containers from being distorted.

BRIEF DESCRIPTION OF THE DRAWINGS

An embodiment of the present invention will now be described more fully with reference to the accompanying drawings in which:

FIG. 9b is an end view of the lower sealing bar of FIG. 9a;

FIG. 17b is a side elevational view of the diverter of FIG. 17a;

FIG. 18b is an end view of a heat sealing and cutting assembly forming part of the heat sealing station of FIG. 18a.

DETAILED DESCRIPTION OF THE PREFERRED EMBODIMENT

Figure 1:
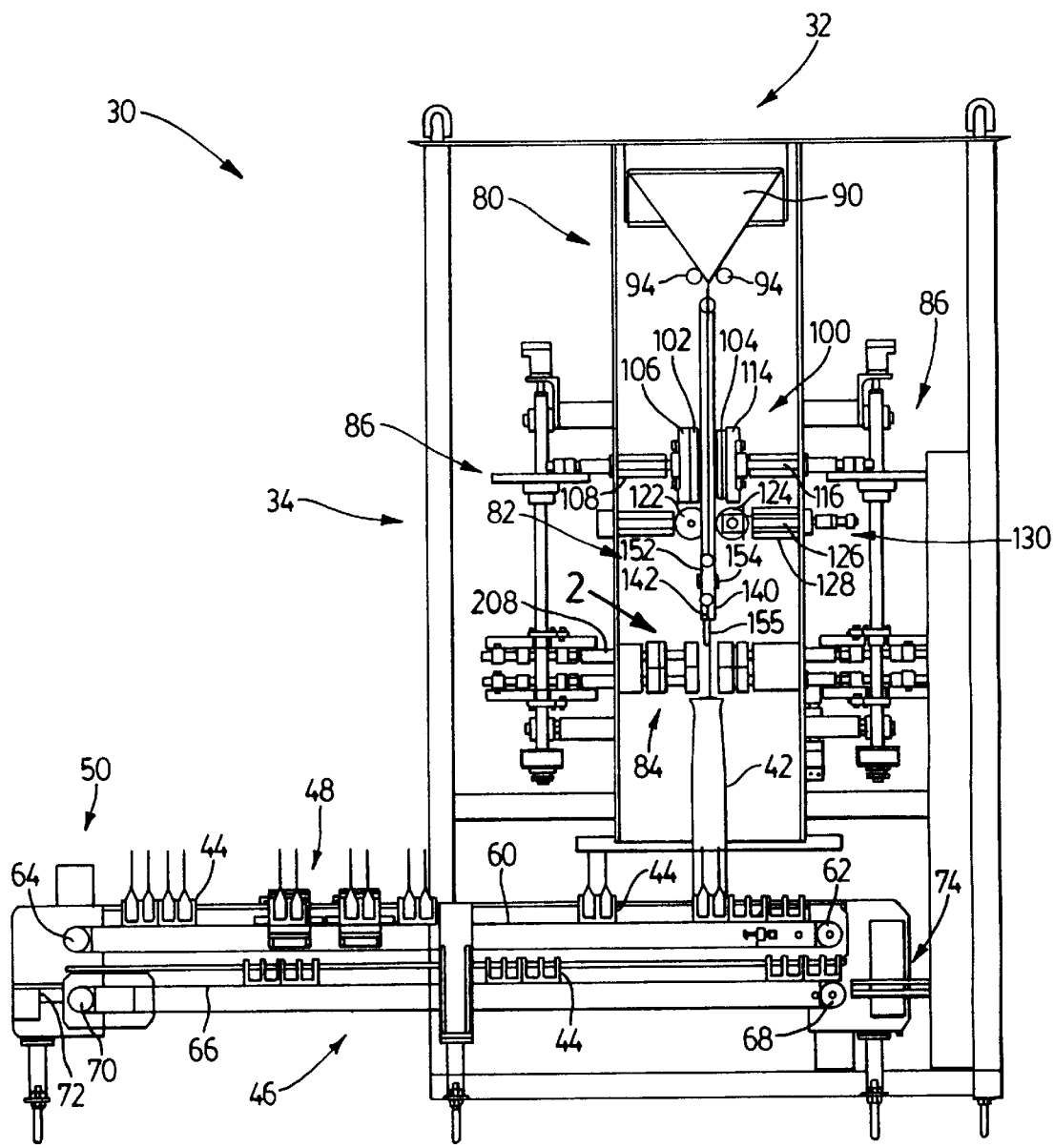
FIG. 1 is a schematic front elevational view of a container forming and delivery system including a container forming apparatus in accordance with the present invention.
Figure 2:
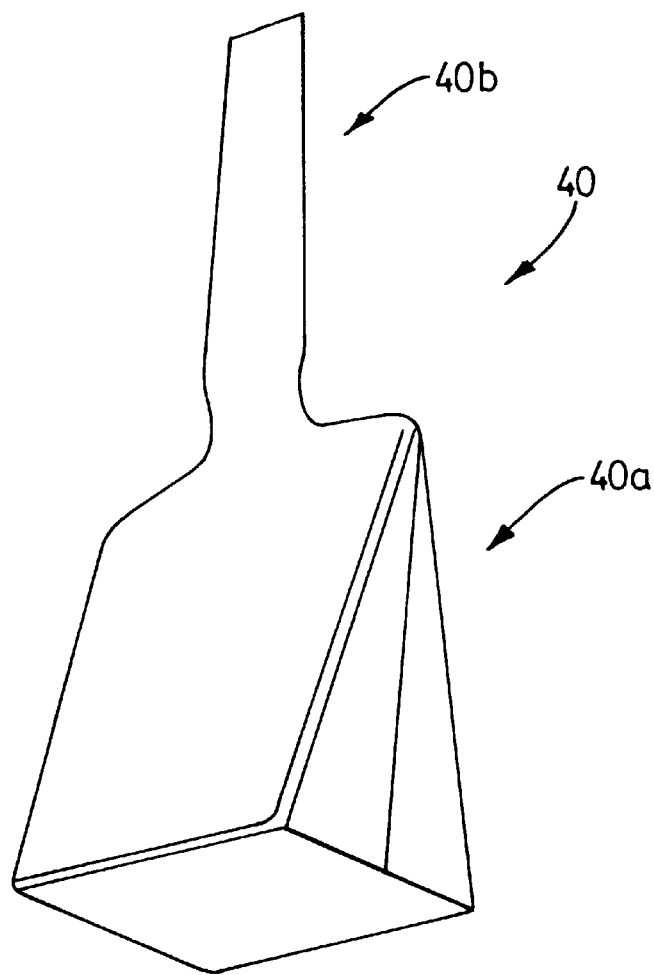
FIG. 2 is a perspective view of a container formed by the container forming apparatus of FIG. 1.

Referring now to FIGS. 1 and 2, a container forming and delivery system is shown and is generally indicated to by reference numeral 30. As can be seen, system 30 includes a container forming apparatus 32 mounted on a frame assembly 34 and receiving a web of flexible packaging material unwound from a roll (not shown). The roll of packaging material is supported on a motor driven shaft (not shown) rotated to deliver packaging material to the container forming apparatus 32 to form individual containers. Container forming apparatus 32 is generally of the form, fill and seal type and is operable to form individual fluid filled containers 40 from the web of packaging material. A diverter 42 is positioned below the container forming apparatus 32 and delivers formed containers 40 to carriers 44 disposed on a conveyor system 46. The conveyor system 46 transports laden carriers 44 to a heat sealing station 48 where the containers 40 are made self-supporting. From station 48, the conveyor system 46 transports the containers 40 to an unloading station 50 where the containers are removed from the carriers 44. The conveyor system 46 then returns the empty carriers 44 to the diverter 42. Further details of the system 30 will now be described.

The conveyor system 46 includes an endless delivery belt 60 wound around head and tail pulleys 62 and 64 respectively. The delivery belt 60 is disposed below and extends from the diverter 42 to the unloading station 50. An endless return belt 66 is also wound around head and tail pulleys 68 and 70 respectively and is positioned beneath the delivery belt 60. Elevator 72 and 74 are positioned at each end of the conveyor system 46. Elevator 72 transports carriers 44 from the delivery belt 60 at the unloading station 50 to the return belt 66 while elevator 74 transports carriers on the return belt 66 to the delivery belt 60 adjacent the diverter 42.

The container forming apparatus 32 includes a tube forming station 80 receiving the web of packaging material and folding and sealing the web to form an open tube, a tube spreading and filling station 82 to delivery fluid to the tube of packaging material and to spread the tube of packaging material prior to sealing, a container forming station 84 to form spaced seals across the tube of packaging material to form individual fluid filled containers 40 and a drive mechanism 86 to synchronize operation of the tube forming station 80, tube spreading and filling station and container forming station 84.

The tube forming station 80 receives the web of packaging material unwound from the roll and includes a folding plate 90 over which the web of packaging material is drawn to fold the web of packaging material over itself. A pair of guide rollers 94 are positioned adjacent the bottom of the folding plate 90 and contact opposite sides of the folded web. The rollers 94 pull the free edges of the web of packaging material together to inhibit the web from traveling. The folded web of packaging material is then fed to a heat sealing mechanism 100 designed to heat seal the free edges of the folded web of packaging material thereby to form a tube.

The heat sealing mechanism 100 includes a vertical heat sealing bar 102 on one side of the web and a corresponding backing plate 104 on the other side of the web. The heat sealing bar 102 and backing plate 104 are aligned with the free edges of the web of packaging material. The heat sealing bar 102 is mounted on a support 106 secured to a cam driven shaft 108 forming part of drive mechanism 86. The backing plate 104 is also mounted on a support 114 secured to a cam driven shaft 116 forming part of drive mechanism 86. The drive mechanism 86 is actuable to reciprocate the heat sealing bar 102 and backing plate 104 between retracted inoperative positions where they are spaced apart and extended operative positions where they are in contact with the web of packaging material trapped therebetween.

Below the heat sealing mechanism 100 is a pair of driven, rubber pull rollers 122 and 124 respectively contacting opposite sides of the tube of packaging material. The pull roller 122 is mounted on the frame assembly 34 and is in a fixed position. The pull roller 124 is secured to a piston 126 extending from a cylinder 128 of a pneumatic drive 130 and is biased towards pull roller 122 so that the tube of packaging material is grabbed by the pull rollers allowing it to be advanced.

Figure 3:
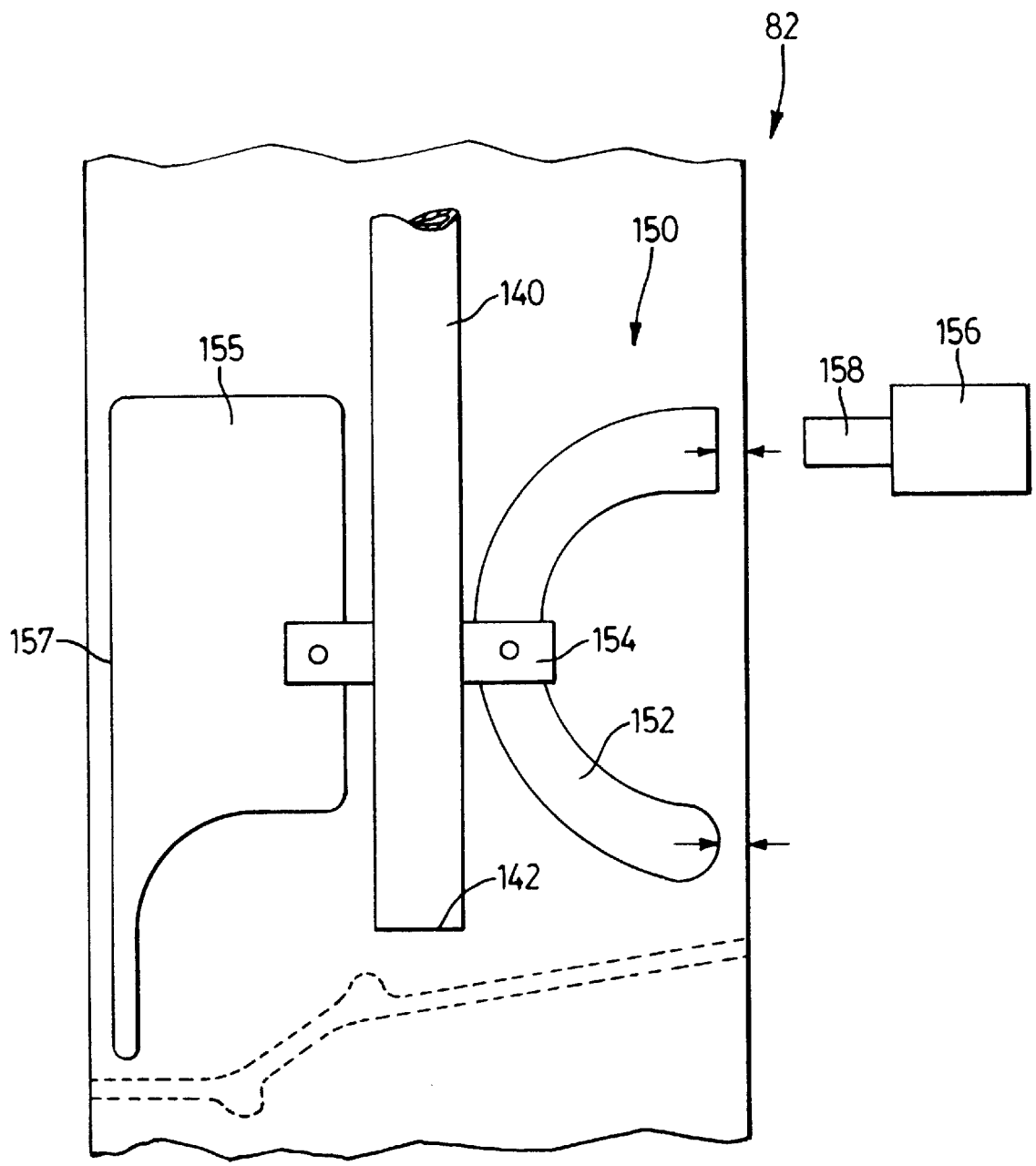
FIG. 3 is an enlarged front elevational view of a tube spreading and filling station forming part of the container forming apparatus of FIG. 1.
Figure 4:
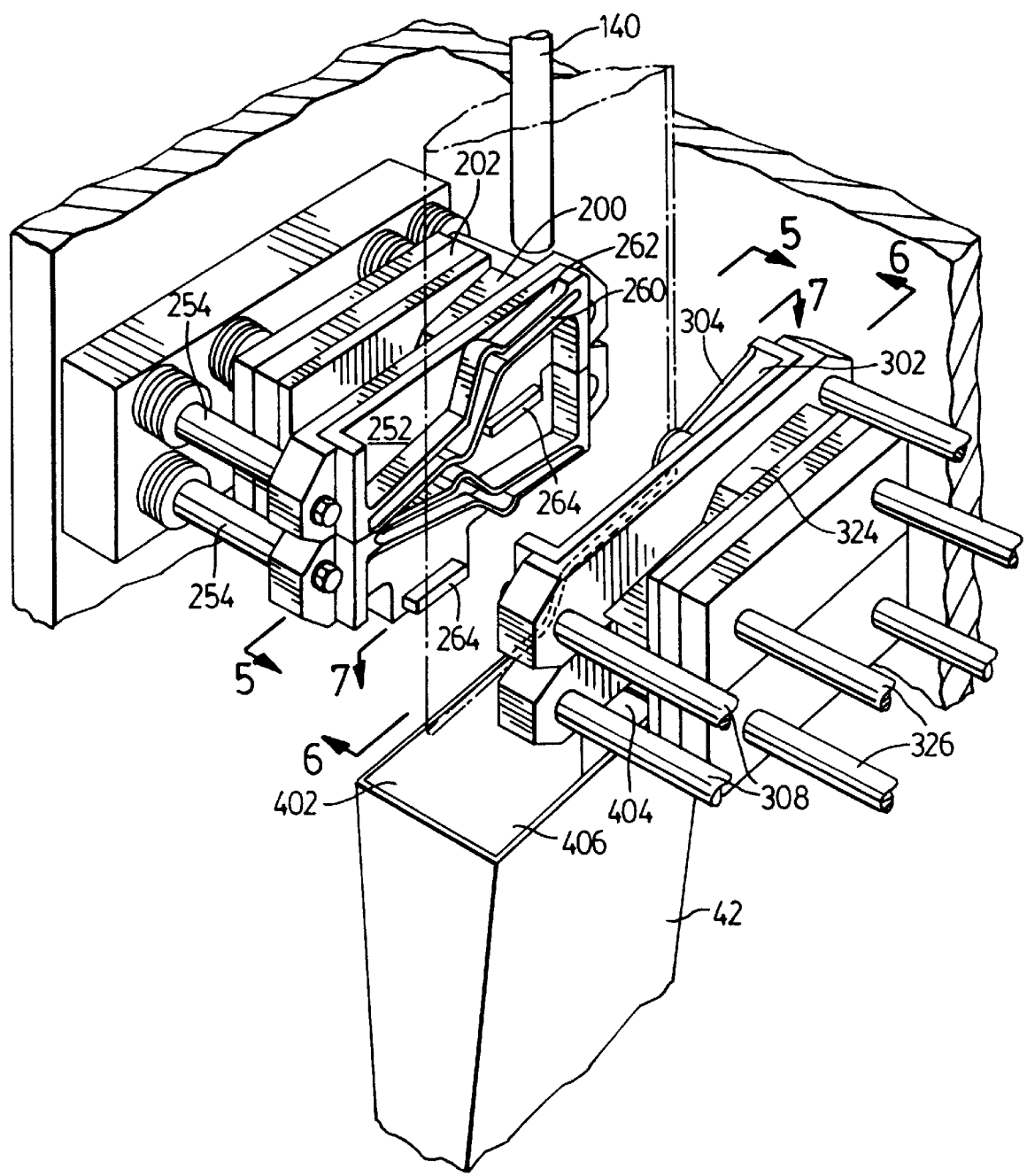
FIG. 4 is simplified perspective view of a container forming station forming part of the container forming apparatus of FIG. 1.
Figure 5:
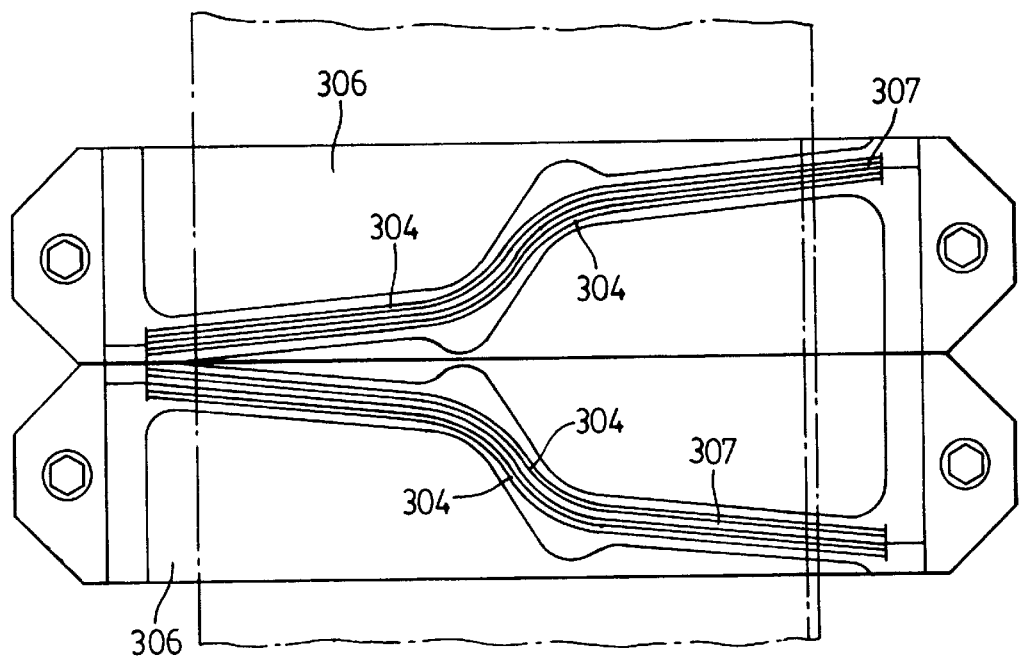
FIG. 5 is a side elevational view of upper and lower backing plates forming part of the container forming station of FIG. 4 taken in the direction of arrow 5.
Figure 6:
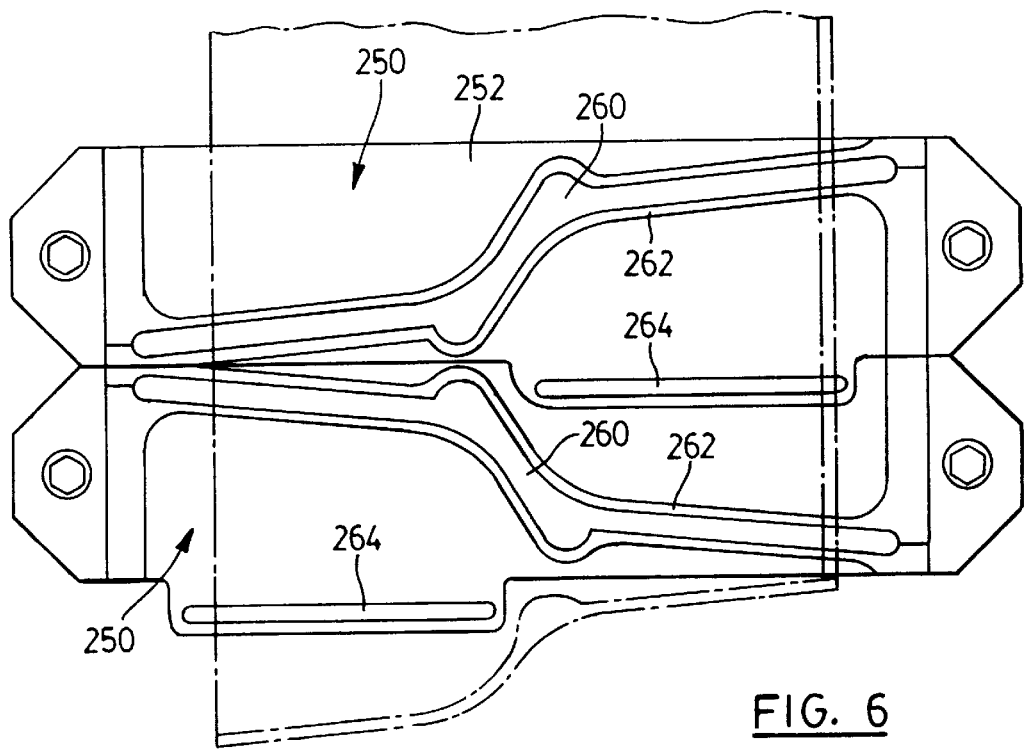
FIG. 6 is a side elevational view of upper and lower sealing clamps forming part of the container forming station of FIG. 4 taken in the direction of arrow 6.
Figure 7:
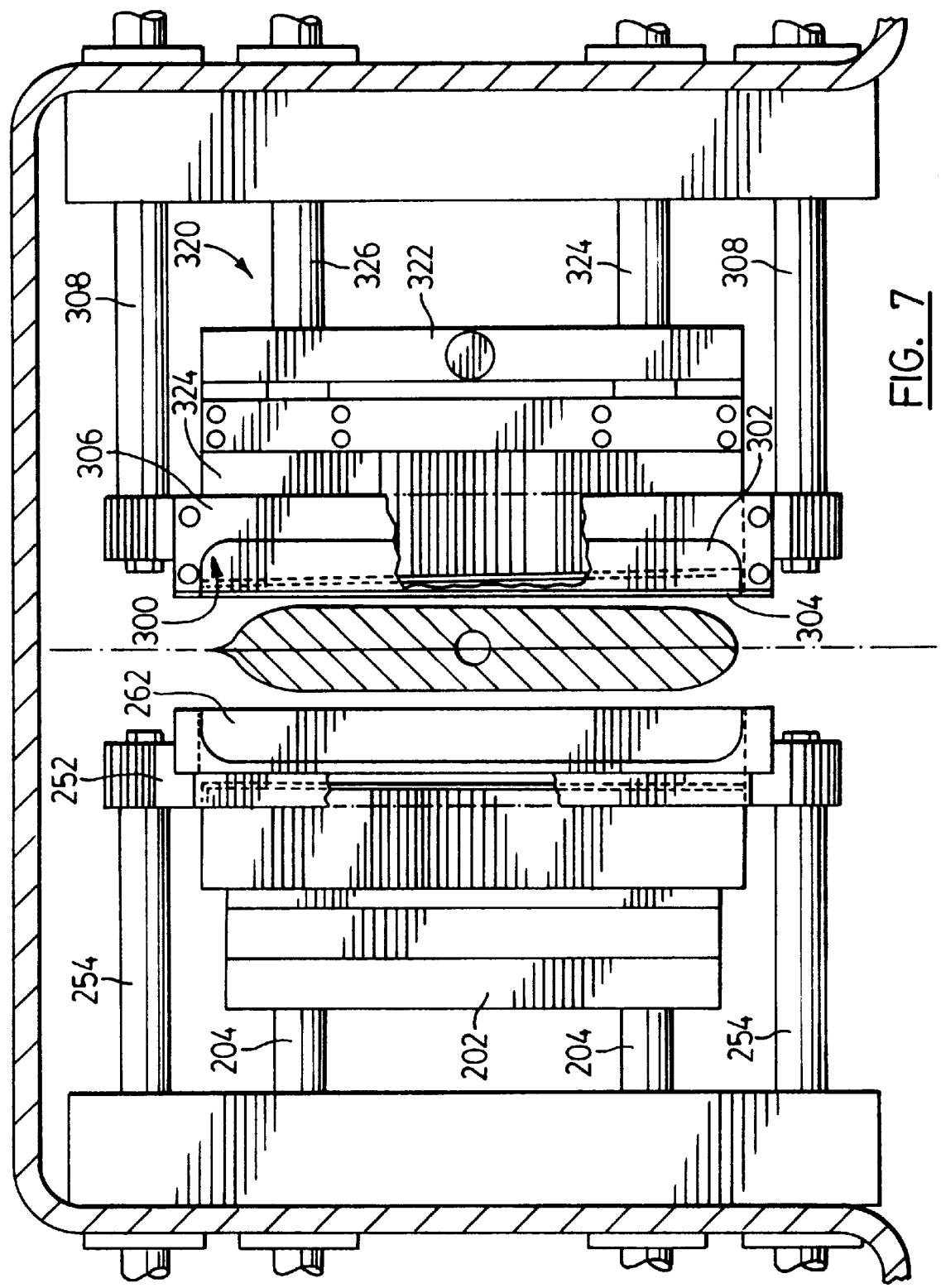
FIG. 7 is a part plan sectional view of the container forming station of FIG. 4 in an indexing condition and taken in the direction of line 7—7 thus, showing the lower sealing clamp and lower backing plate in an open condition.
Figure 8:
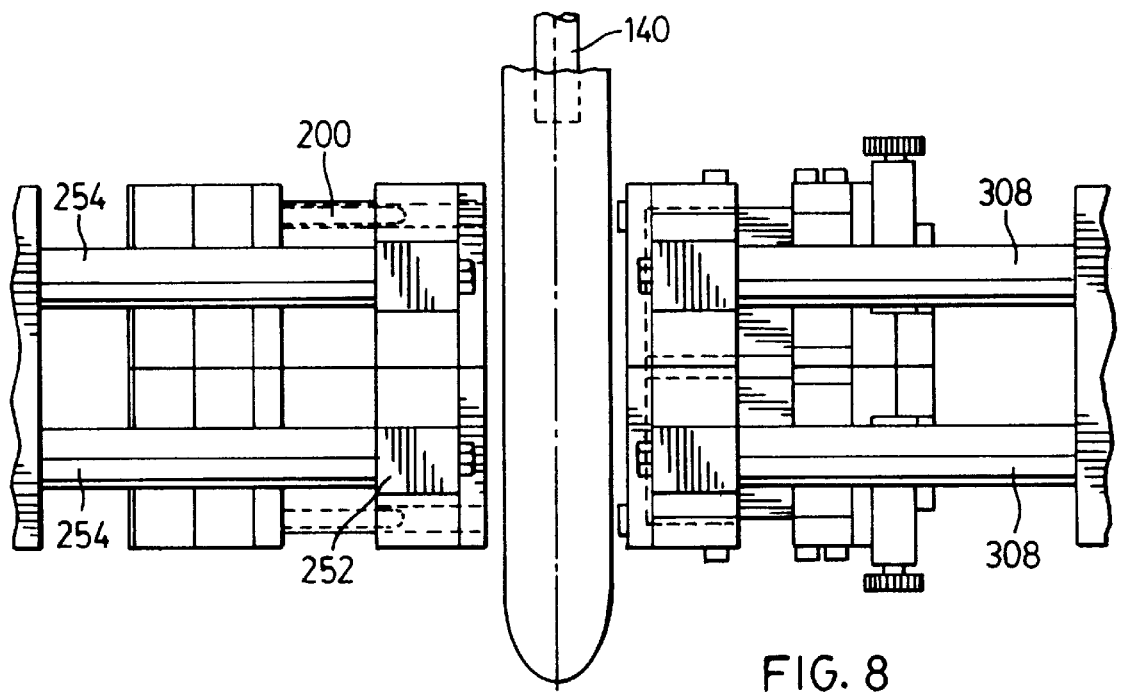
FIG. 8 is a front elevational view of FIG. 7 showing the upper and lower sealing clamps and upper and lower backing plates in the indexing condition with a fluid filled tube of packaging material extending therebetween.
Figure 11:
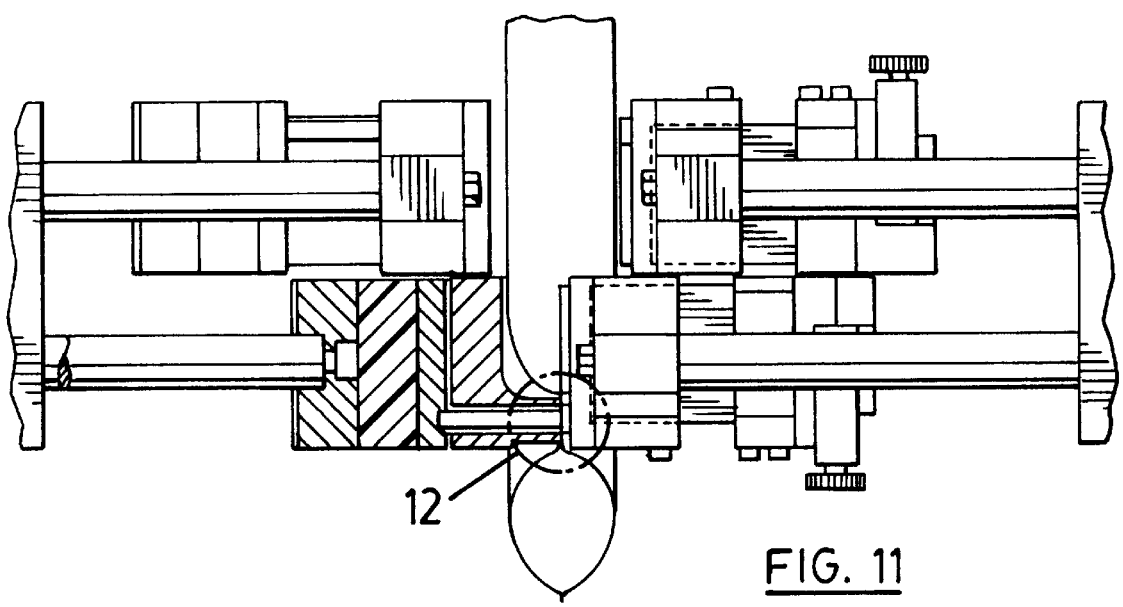
FIG. 11 is a front elevational view of FIG. 10 partially broken away.

The tube filling and spreading station 82 (best seen in FIG. 3) includes a filling tube 140 having an inlet (not shown) receiving fluid to be packaged and an outlet 142 extending into the tube of packaging material to deliver fluid into the tube. A tube spreading device 150 is attached to the filling tube 140 and includes a single prong member 152 mounted to the filling tube 140 by way of a swivel joint 154 positioned adjacent the mid-point of the prong member. Thus, the swivel joint 154 allows the prong member 152 to swing in a plane generally parallel to the longitudinal axis of the tube of packaging material between inoperative retracted conditions and operative extended conditions. The prong member 152 is balanced so that its upstream and downstream ends remain generally equally spaced from the interior of the tube of packaging material in the inoperative condition. A stationary guide 155 is also mounted on the filling tube 140 diametrically opposite the prong member 152. The guide 155 has an outer guide surface 157 extending downwardly to the container forming station 84.

Positioned exterior of the tube of packaging material adjacent the upstream end of the prong member 152 is a pneumatic cylinder 156. The cylinder 156 includes a piston 158 which can be extended to contact the tube of packaging material and hence the upstream end of the prong member 152 causing the prong member to pivot about the swivel joint 154. When the prong member 152 is pivoted in this manner, its downstream end contacts the tube of packaging material. When the tube of packaging material is contacted by the prong member 152, the tube of packaging material is pulled against the guide surface 157 and is spread in a transverse direction making the tube of packaging material more elliptical when viewed in top plan. The prong member 152 and guide 155 are arranged so that the major axis of the spread tube of packaging material extends in the same direction as the longitudinal axes of the containers 40 being formed. This helps to reduce the occurrence of creases in the seals formed across the tube of packaging material by the container forming station 84. When the prong member 152 is in the inoperative position, the tube spreading device 150 allows the tube of packaging material to be indexed by the pull rollers 122 and 124 while avoiding "hang ups" from occurring. Further details of the tube spreading device are described in Applicant's co-pending application filed on even data for an invention entitled "Tube Spreading Device", the content of which is incorporated herein by reference.

Figure 16:
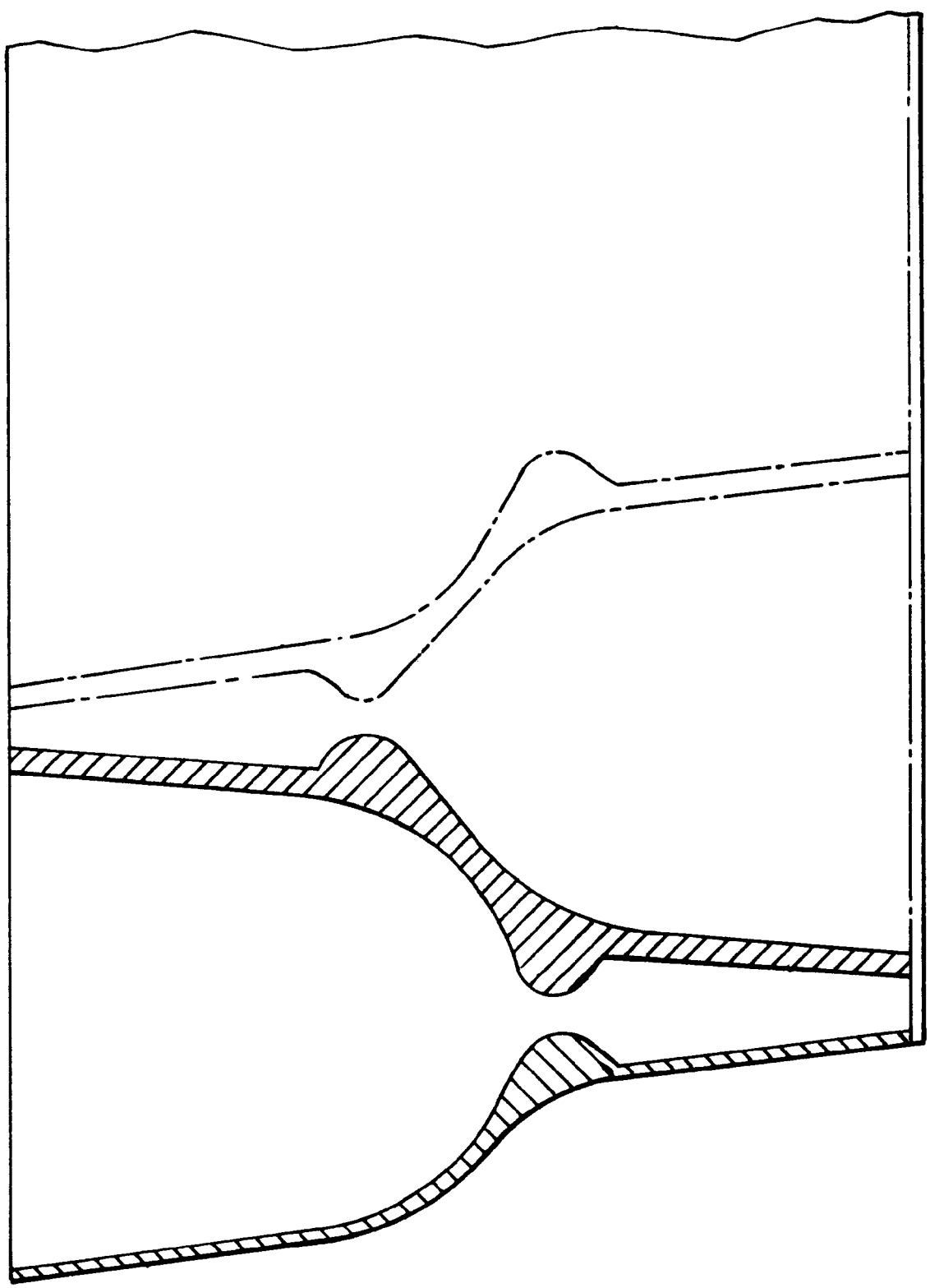
FIG. 16 is a side elevational view of the tube of packaging material after having been sealed by the container forming station of FIG. 4.

The container forming station 84 forms spaced heat seals across the tube of packaging material defining opposed sides of a container. The heat seals are configured so that successive containers 40 formed from the tube of packaging material are alternately oriented and interlocked to reduce packaging material waste (see FIG. 16). Each container 40 (best seen in FIG. 2) includes a body 40*a* defining an internal reservoir and an integral, narrow dispensing spout 40*b* extending from the body. The spout 40*b* tapers towards its distal end. Opposed projections (not shown) are formed on the internal wall of the spout 40*b* adjacent the juncture between the reservoir and the spout. The projections and the dimensions of the spout 40*b* give an individual control over the velocity of out-flowing fluid. Further details of the container can be found in Applicant's PCT application No. PCT/CA96/00783 filed on Nov. 28, 1996, the content of which is incorporated herein by reference.

Referring now to FIGS. 4 to 7, the container forming station 84 is better illustrated. As can be seen, the container forming station includes upper and lower heat sealing bars 200 positioned to one side of the tube of packaging material. The heat sealing bars 200 are curvilinear and when moved to their extended positions contact the tube of packaging material to form seals thereacross through the fluid. Each heat sealing bar 200 is mounted on a support 202 secured to cam driven shafts 204 forming part of the drive mechanism 86.

Figure 9B:
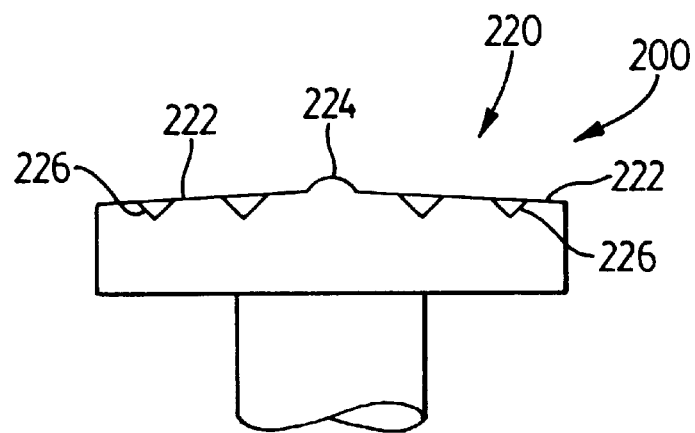
Figure 9A:
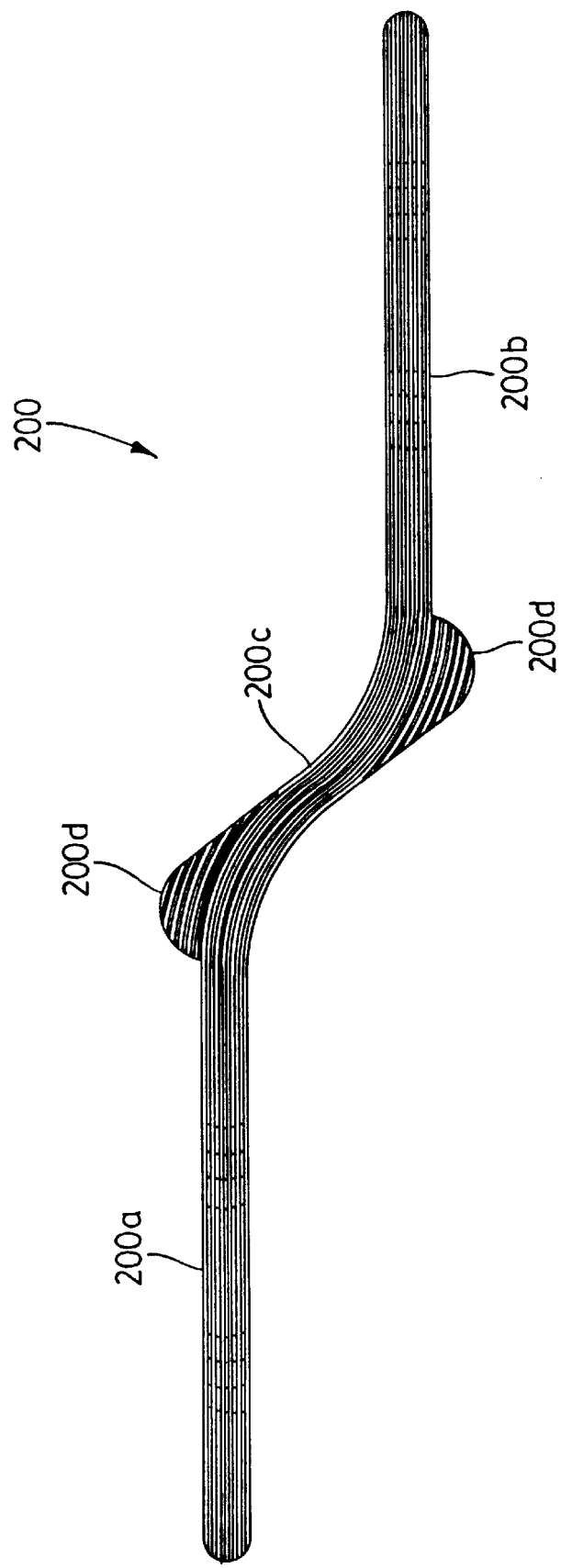
FIG. 9a is a side elevational view of a lower sealing bar forming part of the container forming station of FIG. 4.
Figure 10:
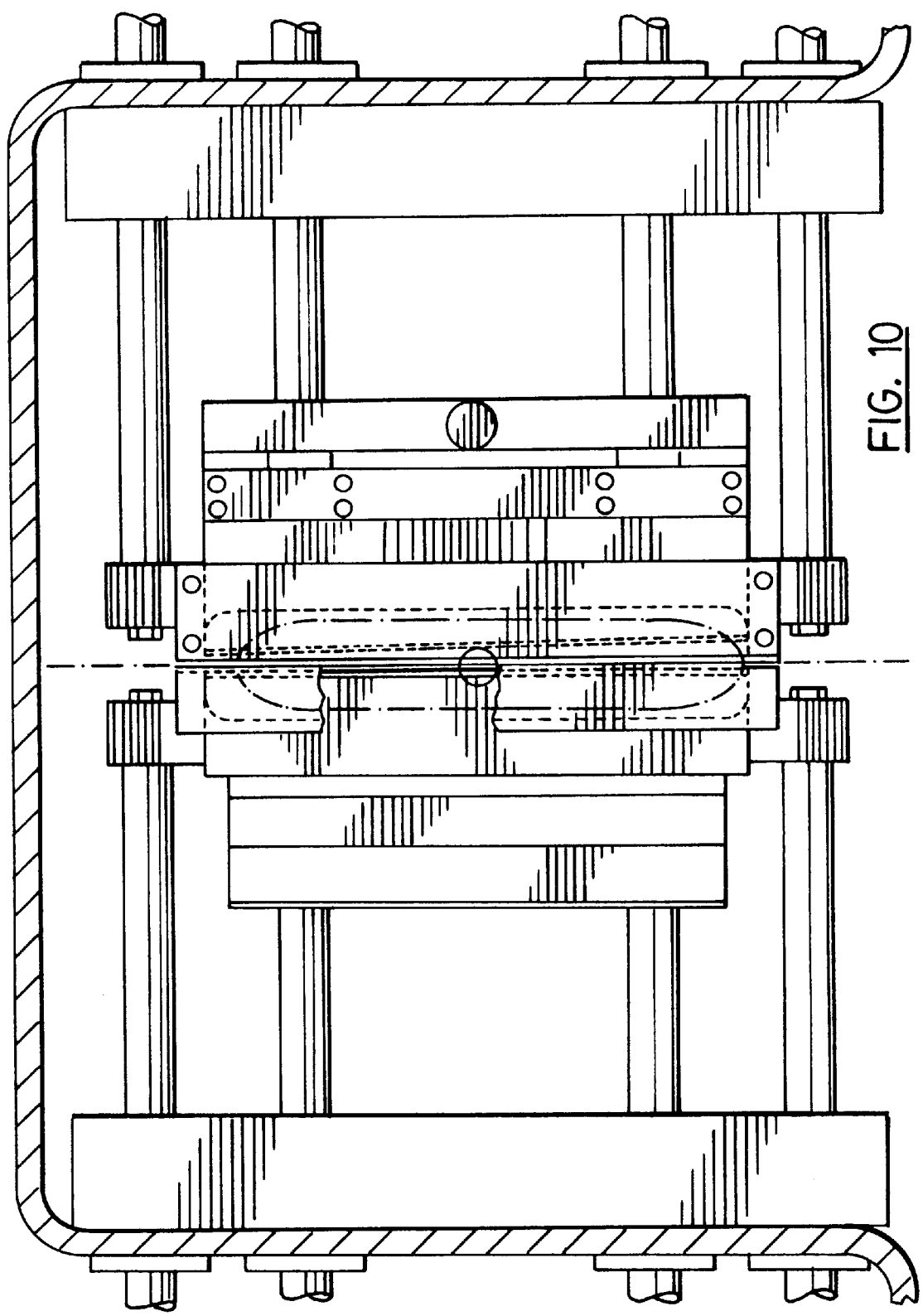
FIG. 10 is a part plan sectional view similar to FIG. 7 with the lower sealing clamp and the lower backing plate in a clamped condition and with a lower sealing bar in an extended position contacting the tube of packaging material.
Figure 14:
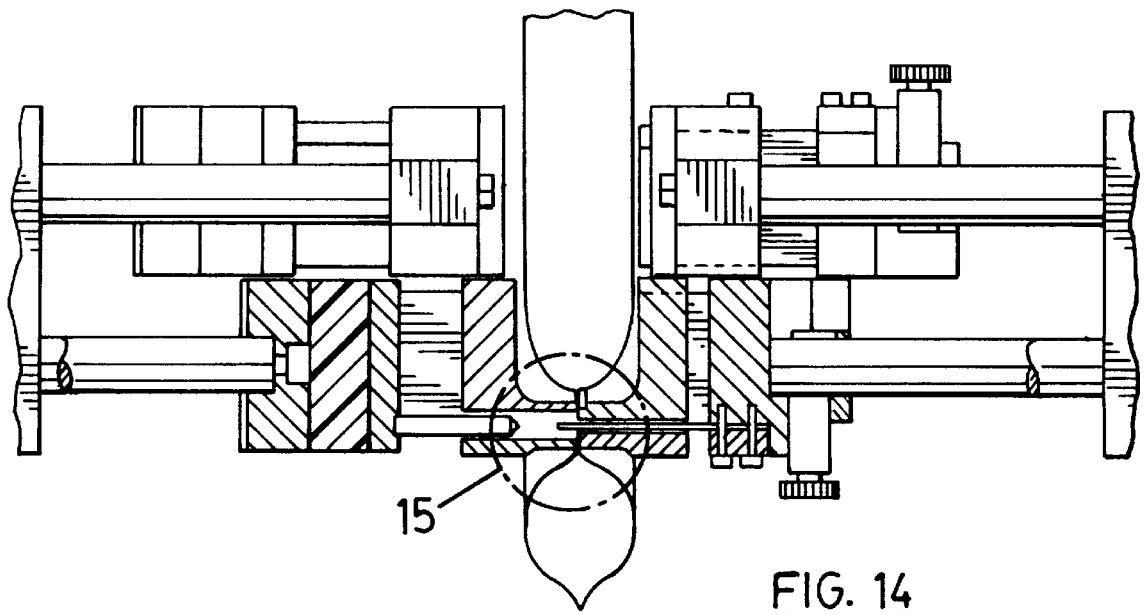
FIG. 14 is a front elevational view of FIG. 13 partially broken away.
Figure 12:
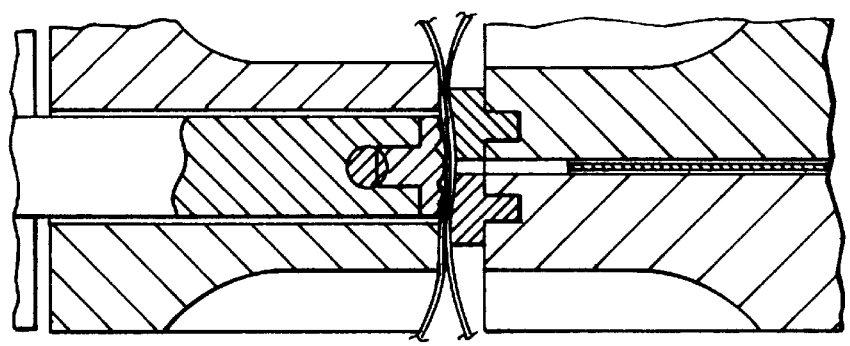
FIG. 12 is an enlarged region of FIG. 11.
Figure 15:
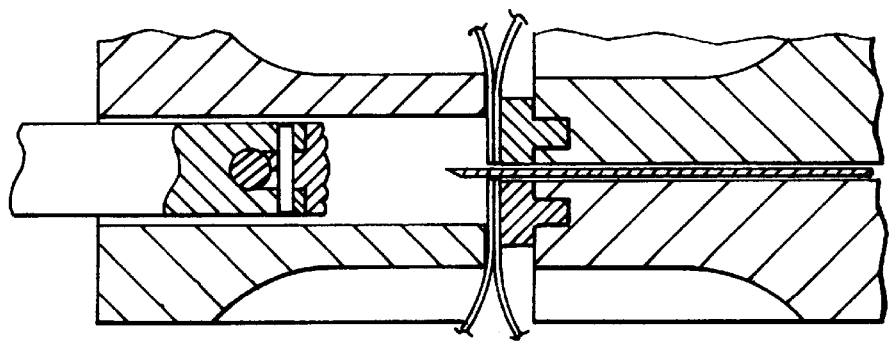
FIG. 15 is an enlarged region of FIG. 14.
Figure 13:
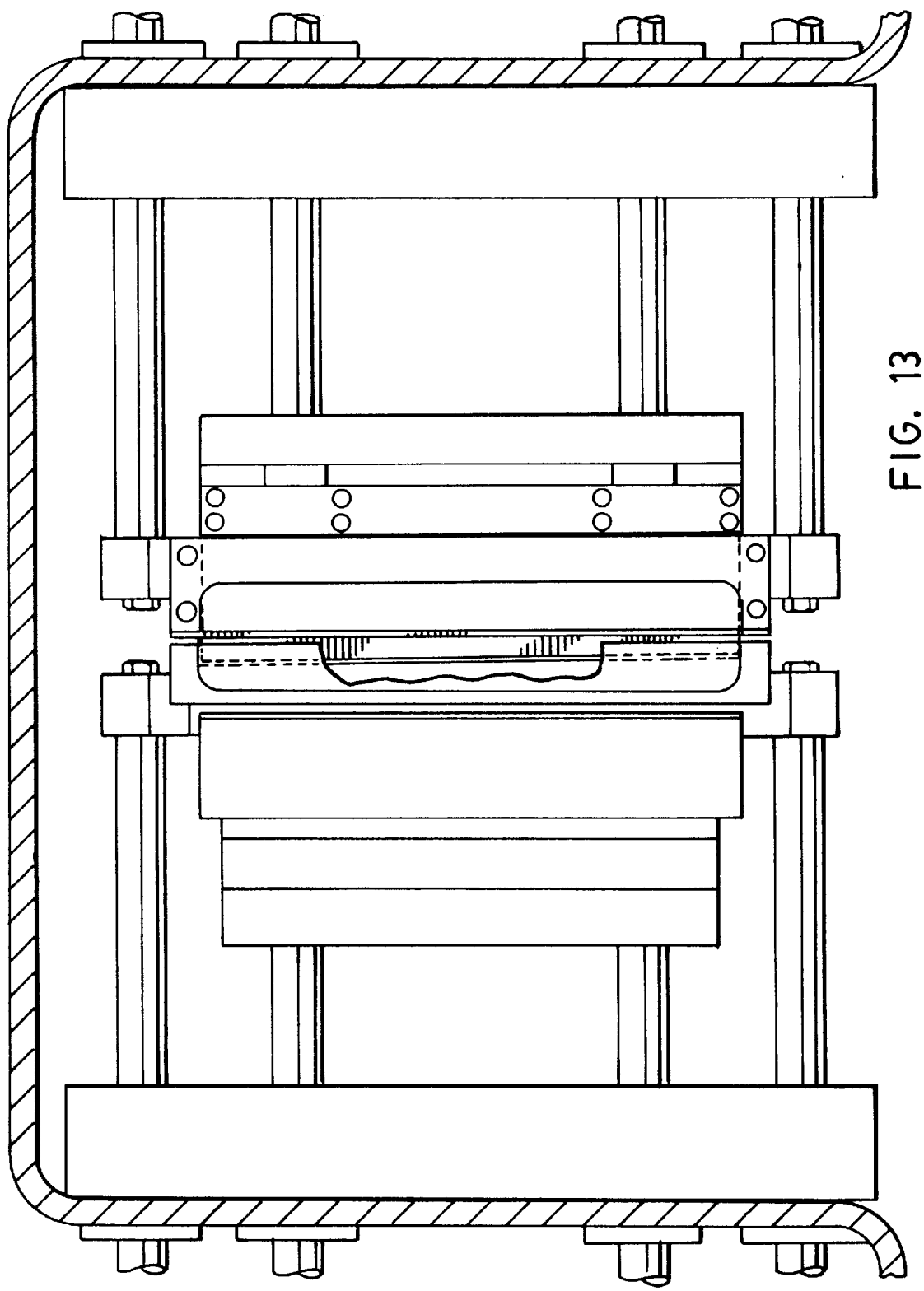
FIG. 13 is a part plan sectional view similar to FIG. 10 with the lower heat sealing bar retracted and with a lower cutting blade extended to cut through the tube of packaging material.

As can be seen in FIG. 9*a*, each heat sealing bar 200 is generally in the shape of a "lazy S" having upper and lower arms 200*a* and 200*b* respectively joined by a bridge 200*c*. Bulges 200*d* are provided at the turns and define the opposed projections within the spouts 40*b* of the containers 40. The outer heat sealing surface 220 of each heat sealing bar 200 is shaped to define slightly angled faces 222 extending from a central ridge 224. The angled faces 222 generally have a slope of between about 0 to 5 degrees. A plurality of parallel spaced, shallow V-shaped channels 226 are formed in each angled face 222 and extend the length of the heat sealing bar 200 (see FIG. 9*b*). The channels 226 are approximately 0.015 inches deep.

Positioned in front of the upper and lower heat sealing bars 200 are upper and lower heat sealing clamps 250. Each heat sealing clamp 250 includes a support 252 secured to cam driven shafts 254 forming part of the drive mechanism 86. A passage 260 corresponding in shape to the associated heat sealing bar 200 is provided through the support 252 to allow the heat sealing bar to pass. A wall 262 projects forwardly from the support 252 and surrounds the passage 260. An elongate hydraulic equalization bar 264 is also provided on the support 252. The hydraulic equalization bar 264 extends in a direction generally orthogonal to the longitudinal axis of the tube of packaging material.

To the opposite side of the tube of packaging material are upper and lower pairs of backing plates 300. Each backing plate 300 is aligned with an corresponds in shape to a respective one of the heat sealing bars 200. Each backing plate 300 includes an anvil 302 having a rubber strip 304 secured to its outer surface. Each backing plate 300 is mounted on a support 306. A slit 307 is formed in the rubber strip 304 and anvil 302 and extends through the support 306. Each support 306 is secured to cam driven shafts 308 forming part of the drive mechanism 86.

Positioned behind each support 306 is a cutting mechanism 320. Each cutting mechanism 320 includes a support 352 having a forwardly extending cutting blade 324 mounted thereon. The cutting blade 324 is aligned with and configured to correspond to the shape of the slit 307. The leading edge of the cutting blade 324 has a central piercing point thereon. The support 322 is secured to cam drive shafts 326 forming part of the drive mechanism 86.

Figure 17B:
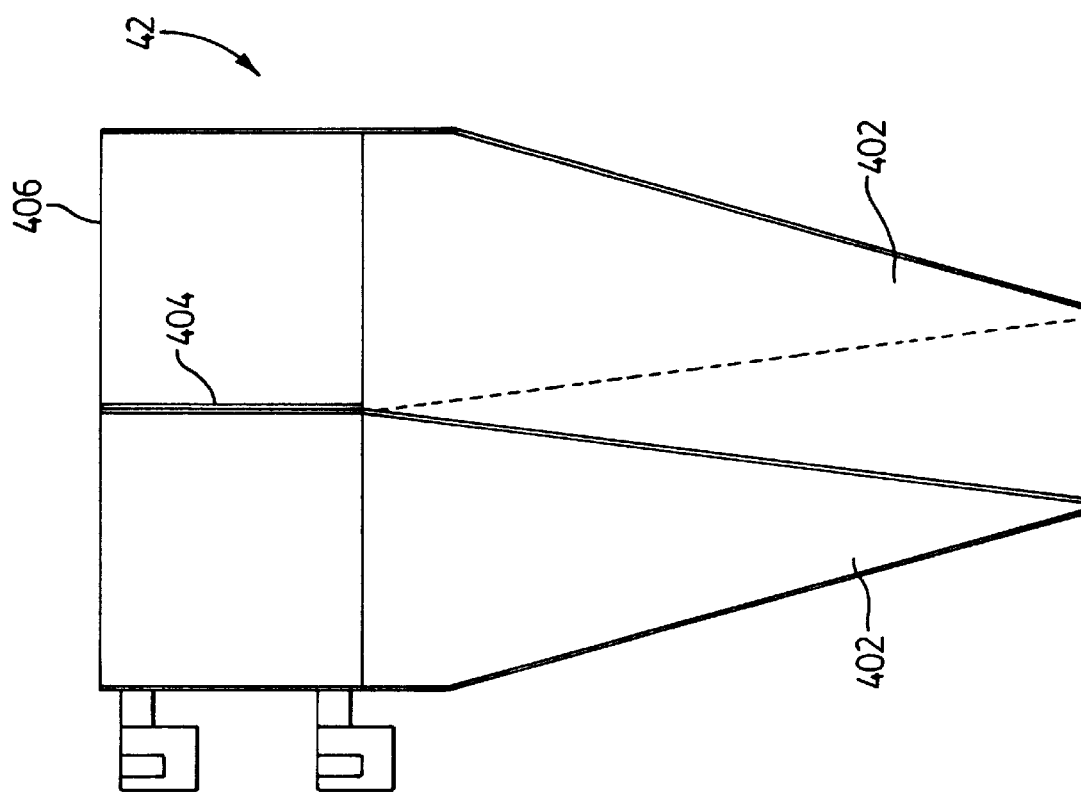
Figure 17A:
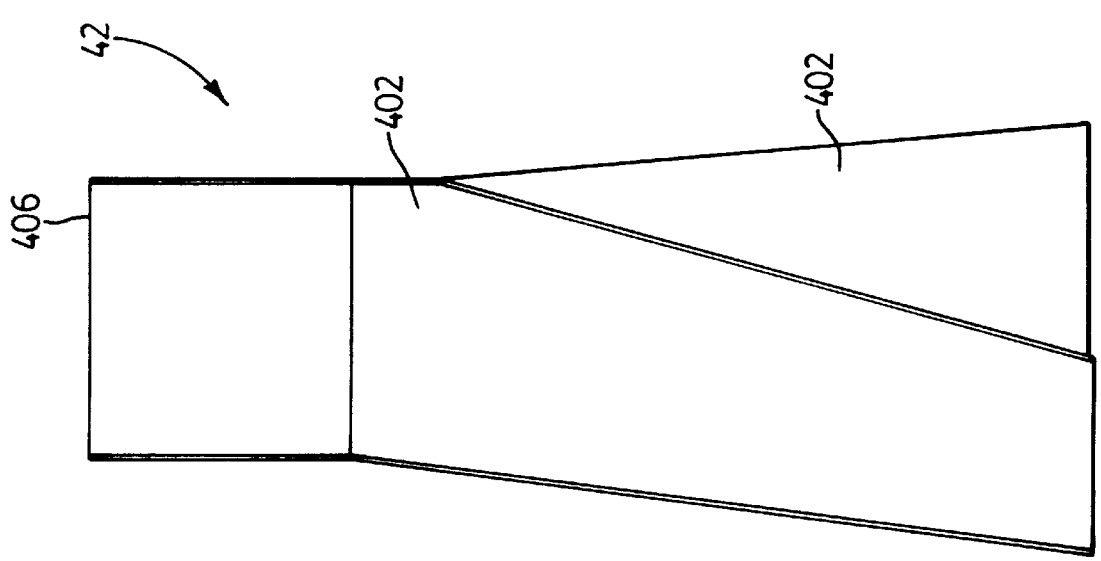
FIG. 17a is a front elevational view of a diverter forming part of the system of FIG. 1.
Figure 17C:
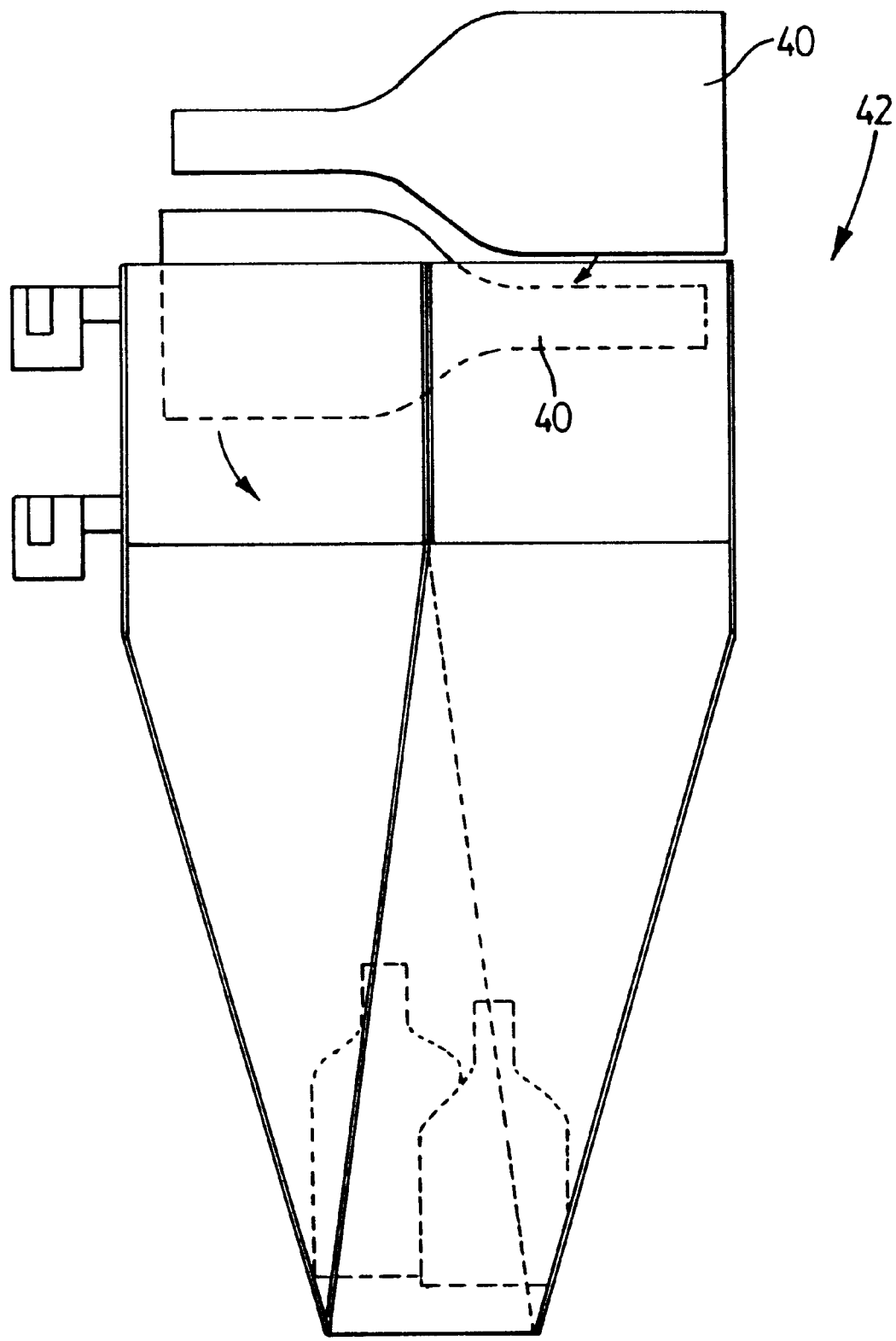
FIG. 17c is a side elevational view of the diverter of FIG. 17a receiving fluid filled containers.

Positioned below the container forming station 84 is the diverter 42 (best seen in FIGS. 17*a* to 17*c*). The diverter includes a pair of side by side chutes 402 separated to a central dividing wall 404. The upper opening 406 of each chute 402 flares outwardly to catch falling containers 40. The chutes 402 are shaped so that successive containers formed by the container forming station 84 are delivered to side by side seats on one of the carriers 44.

Figure 18A:
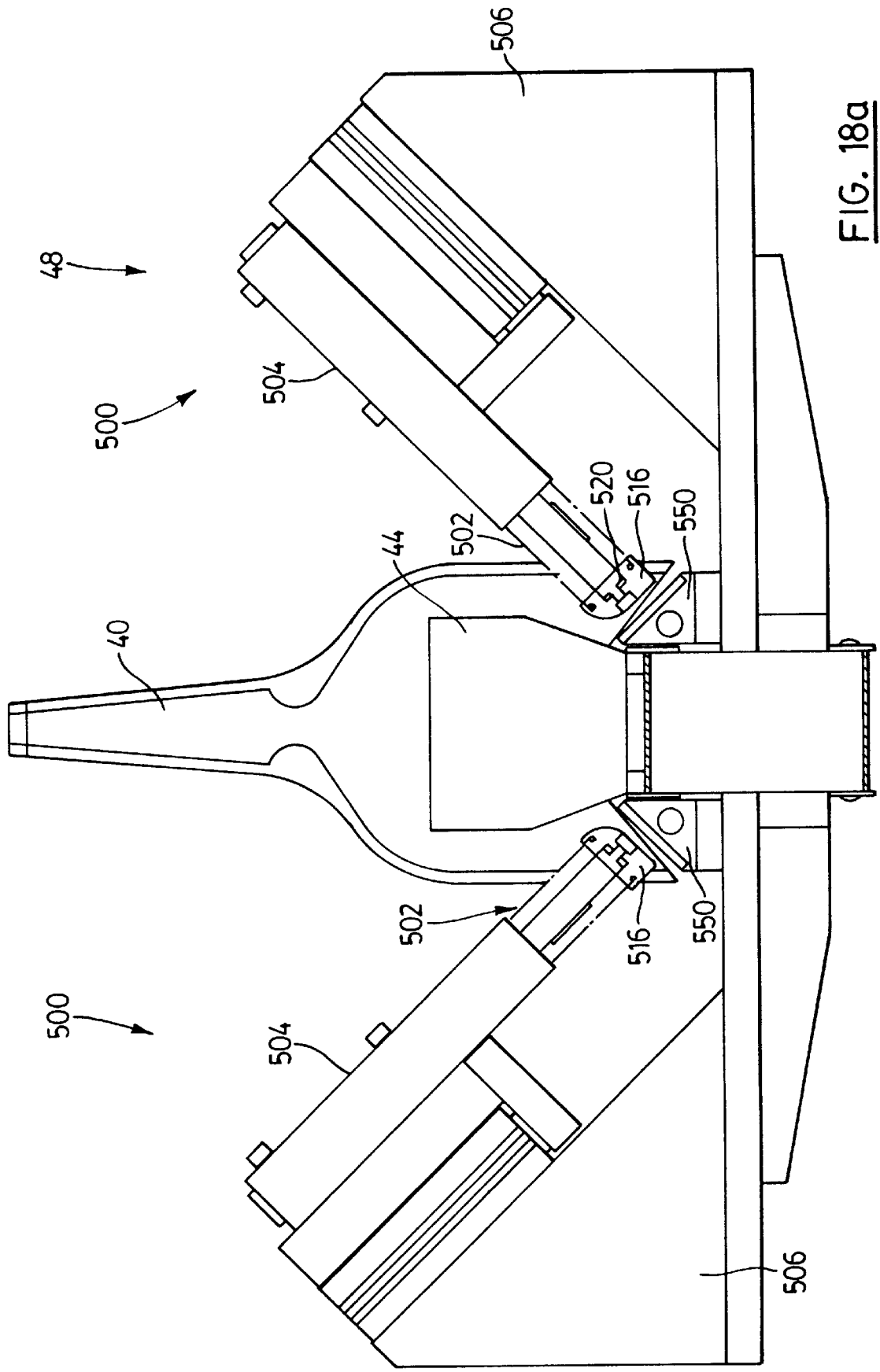
FIG. 18a is a side elevational view of a heat sealing station forming part of the system of FIG. 1.
Figure 18B:
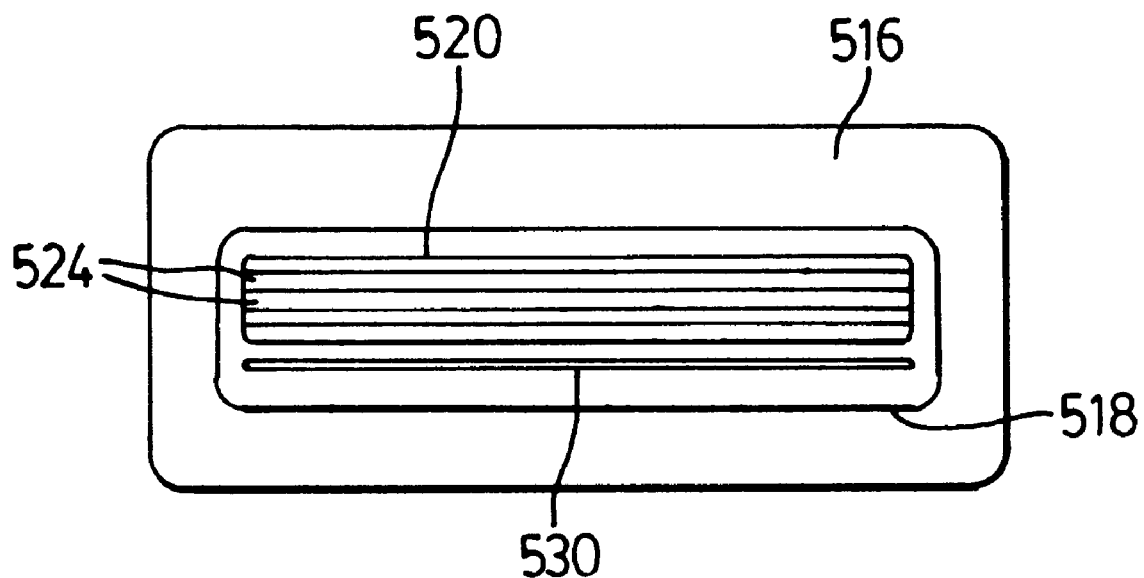

Station 48 includes a pair of heat sealing and cutting machines 500 (best seen in FIGS. 18*a* and 18*b*), each of which is positioned on an opposite side of the delivery belt 60. Each heat sealing and cutting machine 500 includes a heat sealing and cutting assembly 502 secured to a pneumatically controlled air cylinder 504 mounted on an inclined wedge-shaped support 506.

Each heat sealing and cutting assembly 502 includes a fluid displacement unit 516 having an opening 518 therein.

A heat sealing bar 520 having an angled outer heat sealing surface is moveable through the opening 518. Spaced, parallel V-shaped channels 524 are formed in the outer surface of heat sealing bar 520 and extend the length of the heat sealing bar. A cutting blade 530 is positioned behind the heat sealing bar 520 and is also moveable through the opening 518.

The operation of the container forming and delivery system 30 will now be described. As the web material is unwound from the roll by rotating the motor driven shaft, the web material is delivered to the folding plate 90. The web is then pulled over the folding plate 90 which folds the web over itself. The folded web is then pulled together by the rollers 94 before being conveyed to the heat sealing station 100. At the heat sealing station, the heating sealing bar 102 and backing plate 104 are brought together by the drive mechanism 86 to sandwich the folded web and form a seal along the free edges of the folded web thereby to form a tube. The heat sealing bar 102 and backing plate 104 are then retracted by the drive mechanism 86 allowing the tube of packaging material to be indexed by the pull rollers 122 and 124.

After the tube of packaging material has been advanced and assuming that a seal has been formed across the bottom of the tube of packaging material, fluid is delivered into the tube via the filling tube 140 to partially fill the tube. The air cylinder 156 of the tube spreading device 150 is then actuated by the drive mechanism 86 to spread the tube so that it takes generally a more elliptical shape. Thereafter, the lower sealing clamp 250 and lower backing plate 306 are extended by the drive mechanism 86 to clamp the fluid filled tube. The hydraulic equalization bar 264 on the support 252, which is generally in line with the upper arm of the curvilinear seal at the end of the tube of packaging material, supports the tube of packaging material in a direction generally orthogonal to the longitudinal axis of the tube of packaging material. The hydraulic equalization bar 264 is dimensioned so that it displaces fluid in the tube of packaging material upwardly above the lower sealing clamp 250 and backing plate 306. In this manner, the amount of fluid held in the tube of packaging material between the seal at the bottom of the tube and the lower sealing clamp and backing plate is set to the desired amount so that each container has the proper fluid content. The desired amount of displaced fluid is set so that only the reservoir of each container 40 is filled with fluid creating a vacuum in the spout 40b allowing it to be deflated and so that there is sufficient room for the corners of the containers to be pinched to make the containers self-supporting.

Once the lower sealing clamp 250 and backing plate 306 have been brought together and the fluid has been displaced by the hydraulic equalization bar 264, the drive mechanism 86 extends the lower heat sealing bar 200 through the passage 260 in the lower sealing clamp 250 so that the heat sealing bar contacts the tube of packaging material and pins the tube between its outer surface 220 and the rubber strip 304 on the anvil of the backing plate 306. The configuration of the outer surface of the heat sealing bar 200 ensures that as the heat sealing bar contacts the tube of packaging material where the seal is to be formed, fluid is displaced away from the seal in opposite directions.

After the seal has been formed across the tube of packaging material, the drive mechanism 86 retracts the heat sealing bar 200 and then extends the cutting mechanism 320. As the cutting mechanism is extended, the cutting blade 324 passes through the slit 307 and contacts the tube of packaging material generally along the center line of the seal. The leading edge of the cutting blade ensures a clean cut along the seal thereby separating the container 40 from the tube of packaging material. Once this is done, the drive mechanism 86 retracts the cutting mechanism 320 and then retracts the lower backing plate and the lower sealing clamp.

At this state, the upper sealing clamp 250 and backing plate 306 are extended by the drive mechanism 86 to trap the tube of packaging material therebetween. The same sequence of steps is then performed so that a second container is formed and separated from the tube of packaging material. Thereafter, the web of packaging material is indexed twice by the pull rollers 122 and 124 allowing the next two containers to be formed and separated from the tube in succession by the container forming apparatus. FIGS. 10 to 15 illustrate the above-described sequence of events.

As each container is formed and separated from the tube and the upper sealing clamps and backing plates are retracted, the containers 40 fall towards the open upper ends 406 of the chutes 402. Since the reservoirs of the two containers are positioned on opposite sides of the longitudinal axis of the tube of packaging material, the weight of the fluid in the reservoirs causes the containers to fall on opposite sides of the central longitudinal axis of the tube. Each container is therefor received by a different chute 402 of the diverter 42. As each container enters a chute, its spout contacts the dividing wall 404 causing the container to turn upright. The upright containers are then delivered by the chutes 402 to different seats of the carrier 44 positioned below the diverter.

Once the containers are positioned in the seats of the carrier 44, the delivery belt 60 is driven to advance the carrier to the station 48. When the carrier arrives at the station, the pneumatic air cylinders 504 are actuated to bring the assemblies 502 into contact with opposed bottom corners of the body 40a thereby to pinch the corners of the container between the assemblies and wedge-shaped backing plates 550. The displacement units 516 displace fluid from the pinched corners into the reservoir. The heat sealing bars 520 are then extended through the openings 518 to form seals. As the seals are being formed, the cutting blades 530 are extended to cut the corners behind the seals and thereby remove the corners from the containers. The heat sealing bars and cutting blades are then retracted and the pneumatic air cylinders are actuated to retract the heat sealing and cutting mechanisms.

Following this, the delivery belt 60 is driven to deliver the self-supporting containers to the unloading station 50 where the containers are removed from the carriers 44. Once emptied, the carries 44 are carried by the elevator to the return belt allowing the return belt to deliver the carriers to the elevator so that the carries can be placed back on the delivery belt adjacent the container forming apparatus 32. The above operation can be performed at a high speed allowing fluid filled containers to be formed quickly.

As will be appreciated, since the tube is supported in a direction generally orthogonal to the longitudinal axis of the tube at positions adjacent the seals as each seal is being formed, the forces applied to the tube by the fluid column below the sealing clamp and backing plate are generally equalized across the tube allowing high integrity seals to be formed. It has been found that when the tube is not supported in this manner and curvilinear seals are formed across the tube, the unequal forces applied to the tube by the fluid column create stresses which compromise the integrity of the seals as they are formed and distort the shape of the containers.

Although a preferred embodiment of the present invention has been described, those of skill in the art will appreciate that variations and modifications may be made without departing from the spirit and scope thereof as defined by the appended claims.

I claim:

1. A method of forming fluid containers from an upright tube formed of flexible packaging material, said method comprising the steps of:

providing a heat sealing mechanism having upper and lower sealing clamps, each sealing clamp including a curved seal bar and a support;

delivering fluid to said tube to fill at least a portion of said tube;

forming first and second curved seals across said tube at vertically spaced locations between which fluid is located to define a fluid filled container, said curved seals being mirror images of one another about a plane transverse to a longitudinal axis of the tube and defining opposite sides of a container having a wide main body and a narrow spout extending generally central from said main body, a lower one of said curved seals being formed across said tube prior to an upper one of said curved seals, each of said curved seals including a lower arm portion and an upper arm portion joined by a bridge; and during formation of each of said seals, supporting said tube below said upper arm portion at a location adjacent said lower arm portion to displace fluid in the tube upwardly and thereby equalize generally hydraulic forces across said tube adjacent said lower arm portion.

2. A container forming apparatus to form fluid filled containers from an upright tube formed of flexible packaging material, said apparatus comprising:

a fluid delivery conduit to deliver fluid into said tube to fill at least a portion of said tube;

a heat sealing mechanism receiving said tube and having upper and lower sealing clamps, each of said clamps including a curved heat sealing bar for forming vertically spaced, curved seals across said tube between which fluid is located to define a fluid filled container, said seals being mirror images of one another about a plane transverse to a longitudinal axis of the tube and defining opposite sides of a container having a wide main body and a narrow spout extending generally centrally from said main body, a lower one of said curved seals being formed across said tube prior to an upper one of said curved seals, each of said curved seals including a lower arm portion and an upper arm portion joined by a bridge; and a support integral with each of said sealing clamps of said heat sealing mechanism, one of said supports acting on said tube during formation of the lower one of said curved seals and another of said supports acting on said tube during formation of the upper one of said curved seals, wherein during formation of each of said curved seals, the associated support supports said tube below said upper arm portion at a location adjacent said lower arm portion to displace fluid in the tube upwardly and thereby equalize generally the hydraulic column above said lower arm portion.

3. The method of claim 1 further comprising the step of, after forming said curved seals, indexing said tube and repeating said fluid delivery, seal forming and tube supporting steps.

4. The method of claim 3 further comprising the step of, after said curved seals have been formed and prior to said indexing step, separating said fluid filled container from said tube.

5. The method of claim 3 wherein during said supporting step, said tube is supported in a transverse direction below said lower arm portion.

6. The method of claim 5 wherein during said supporting step, said tube is supported in a transverse direction at a location generally in line with the upper arm portion of the previously formed seal.

7. An apparatus as defined in claim 2 further comprising a tube advancement mechanism to index said tube after said heat sealing mechanism has formed said curved seals across said tube, said heat sealing mechanism being conditioned to form said curved seals across said tube after said tube has been indexed.

8. An apparatus as defined in claim 7 further comprising a tube cutting mechanism to separate said fluid filled container from said tube.

9. An apparatus as defined in claim 7 wherein each of said supports is in the form of an elongate bar.

10. An apparatus as defined in claim 9 wherein each of said bars supports said tube at a location below said lower arm portion.

11. An apparatus as defined in claim 10 wherein each of said bars supports said tube in a transverse direction generally in line with the upper arm portion of the previously formed seal.

12. An apparatus as defined in claim 7 wherein said heat sealing mechanism includes a pair of lower heat sealing jaws and a pair of upper heat sealing jaws, said lower and upper heat sealing jaws being actuable to clamp said tube thereby to form said lower and upper curved seals.

13. An apparatus as defined in claim 12 wherein each pair of jaws carries a support.

14. An apparatus as defined in claim 13 wherein each pair of jaws includes a heat sealing bar shaped to form a curved seal on one side of said tube and an associated backing plate on an opposite side of said tube.

15. An apparatus as defined in claim 14 wherein each pair of jaws includes a carrier carrying said heat sealing bar and said support.

16. An apparatus as defined in claim 15 wherein each of said supports acts on said tube at a location below said lower arm portion.

17. An apparatus as defined in claim 16 wherein each of said supports is in the form of an elongate bar.

18. An apparatus as defined in claim 17 wherein each of said bars supports said tube in a transverse direction generally in line with the upper arm portion of the previously formed seal.

19. An apparatus as defined in claim 18 wherein each of said elongate bars is an obround.

* * * * *